Jan. 12, 1926.  
G. F. COLLEY  
BOLT LOCK  
Filed June 15, 1923
1,569,718
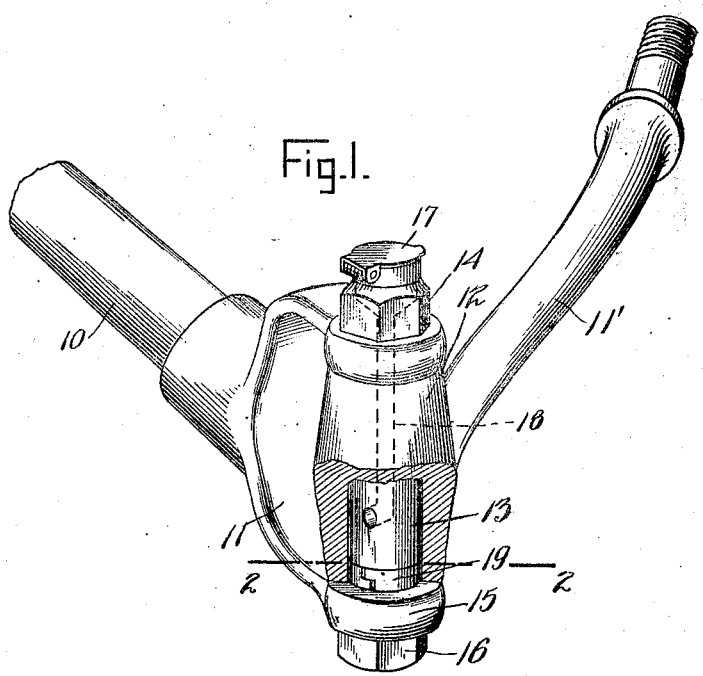
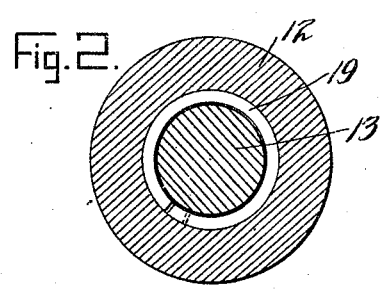
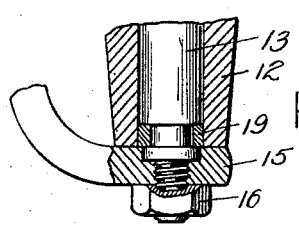
Inventor  
George F. Colley  
By
Attorney Patented Jan. 12, 1926.

1,569,718

UNITED STATES PATENT OFFICE.

GEORGE F. COLLEY, OF MEMPHIS, TENNESSEE, ASSIGNOR TO JOHN Q. ROBERTS, OF MEMPHIS, TENNESSEE.

BOLT LOCK.

Application filed June 15, 1923. Serial No. 645,671.

*To all whom it may concern:*

Be it known that I, GEORGE F. COLLEY, a citizen of the United States, residing at Memphis, in the county of Shelby and State of Tennessee, have invented certain new and useful Improvements in Bolt Locks, of which the following is a specification.

My said invention relates to a knuckle for steering rod connections and it is an object of the same to provide a bolt for such connections with means for securing it in place which means shall act to retain the oil in the joint and keep the dust out.

Referring to the accompanying drawings, which are made a part hereof and on which similar reference characters indicate similar parts, Figure 1 is a perspective of my device, and Figure 2, a section on line 2—2 of Figure 1.

Figure 3 is a detail section showing the connection between the bolt and the lower member of the fork.

In the drawings reference character 10 indicates the spindle connecting rod to which the spindle arms are connected and 11' a spindle arm connected at its free end to a sleeve movable with the axle of a wheel in steering. The rod 10 has the usual yoke 11 between the arms of which is a hollow hub 12 on the arm 11' and a bolt 13 passes through the openings in the hub and the arms and serves to connect the parts together. In the device as illustrated the bolt has a head 14 and is threaded at its lower end to engage threads in the enlarged end of the lower yoke arm 15. A locknut 16 is provided for locking the bolt in place.

At its upper end the bolt is hollow to provide an oil space or cup which is closed by a spring-pressed hinged lid cap 17 and a passage 18 leads downward from the oil space and out through the wall of the bolt to the bearing surfaces. Just above the arm 15 the bolt has an annular groove in which is located a split spring washer 19 which is compressed to pass with the bolt through the openings in the upper yoke arm and the hub 12 but which springs out so far as permitted by the bore of the hub so as to close the joints respectively between the bolt and the hub on one side and between the bolt and the extension 15 on the other side. Due to its action in closing the first joint it prevents the oil from escaping out of the bearing and due to its action at the lower joint it prevents the dirt from working upward into the bearing.

The dirt excluding function of the spring washer just described is of minor importance so far as the passage of dirt between the bolt and the extension 15 is concerned when the screw threaded connections as described are used but the tie rod connection is almost equally effective when the threads on the arm 15 are omitted in which case there is more chance for dirt to work up through the bolt than in the construction illustrated. Dirt is also prevented from working in between the lower face of the hub and the upper face of arm 15.

It will be evident that even if the head and the nut on the bolt were entirely omitted it would be held quite efficiently in place by the spring washer and that if another similar washer were located near the upper end it would be held in place so effectively as to hardly be removable. In the case of a longer shaft such washers could be located at intervals to maintain the proper distribution of oil and act progressively to exclude dirt from the bearings while also serving to prevent endwise movement of such a shaft. The entry of dirt, as is well known, is one of the principal causes of wear on the bolt itself and on the surrounding bearings and also is one of the principal causes of rattling in automobiles. The split ring could be made a little tapered at the lower end for easier entry and the shoulder on which it rests could be tapered slightly to match the taper on the ring for better excluding the dirt if deemed advisable and many other changes will be obvious to those skilled in the art without departing from the spirit of my invention. Therefore I do not limit myself to what is shown in the drawings and described in the specification, but only as indicated in the appended claims.

Having thus fully described my said invention, what I claim as new and desire to secure by Letters Patent, is:

1. A knuckle joint comprising a forked member having openings in the forks and having the opening in one of the forks threaded, an intermediate member having an opening adapted to register with said openings, a bolt extending through said openings and having an annular groove between the ends of the opening in the intermediate member, a ring in said groove, said bolt being threaded at one end for engagement with threads in the opening of the corresponding fork to press said ring tightly against said fork, substantially as set forth.

2. A joint comprising a forked member having openings in the forks, an intermediate member having an opening adapted to register with said openings, a bolt adapted to be inserted through the openings in the forks and intermediate member to form a pivotal connection, that portion of the bolt disposed within the extremities of the intermediate member having a groove about the same adjacent one end, and a split spring ring in said groove tending to expand into engagement with the bore of the intermediate member and to a diameter larger than that of the opening in the adjacent fork and consequently bear upon said fork around said opening, substantially as set forth.

In witness whereof, I have hereunto set my hand and seal at Memphis, Tennessee this 2nd day of June, A. D. nineteen hundred and twenty-three.

GEORGE F. COLLEY. [L. S.]